US008848617B2

(12) United States Patent
Ságfors et al.

(10) Patent No.: US 8,848,617 B2
(45) Date of Patent: Sep. 30, 2014

(54) METHOD AND SYSTEM OF CHANNEL RESOURCE ALLOCATION

(75) Inventors: Mats Ságfors, Kyrkslätt (FI); Janne Peisa, Espoo (FI); Michael Meyer, Aachen (DE); Reiner Ludwig, Huertgenwald (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 3613 days.

(21) Appl. No.: 10/501,513

(22) PCT Filed: Jan. 31, 2003

(86) PCT No.: PCT/SE03/00176
§ 371 (c)(1),
(2), (4) Date: Feb. 7, 2005

(87) PCT Pub. No.: WO03/065739
PCT Pub. Date: Aug. 7, 2003

(65) Prior Publication Data
US 2006/0235735 A1 Oct. 19, 2006

(30) Foreign Application Priority Data
Jan. 31, 2002 (SE) ..................................... 0200311

(51) Int. Cl.
| | | |
|---|---|---|
| H04W 4/00 | (2009.01) | |
| H04L 12/911 | (2013.01) | |
| H04L 12/851 | (2013.01) | |
| H04L 1/00 | (2006.01) | |
| H04W 72/02 | (2009.01) | |
| H04L 12/54 | (2013.01) | |
| H04L 12/801 | (2013.01) | |
| H04L 12/853 | (2013.01) | |
| H04W 74/02 | (2009.01) | |
| H04W 72/04 | (2009.01) | |
| H04W 28/04 | (2009.01) | |
| H04L 1/16 | (2006.01) | |

(52) U.S. Cl.
CPC ............ *H04L 47/822* (2013.01); *H04L 47/823* (2013.01); *H04W 74/02* (2013.01); *H04L 47/2425* (2013.01); *H04L 1/0003* (2013.01); *H04L 47/824* (2013.01); *H04W 72/04* (2013.01); *H04L 47/2441* (2013.01); *H04W 72/02* (2013.01); *H04W 28/04* (2013.01); *H04L 12/5695* (2013.01); *H04L 1/1607* (2013.01); *H04L 47/15* (2013.01); *H04L 47/2416* (2013.01); *H04L 47/14* (2013.01)
USPC ........... 370/329; 370/341; 455/450; 455/451; 455/452.1; 455/452.2

(58) Field of Classification Search
USPC ............... 370/329, 341; 455/450, 451, 452.1, 455/452.2
See application file for complete search history.

(56) References Cited

U.S. PATENT DOCUMENTS 5,359,593 A 10/1994 Derby et al.
5,457,680 A * 10/1995 Kamm et al. ................. 370/332

(Continued)

FOREIGN PATENT DOCUMENTS

GB 2351874 A 1/2001
WO WO 0016573 A1 3/2000

OTHER PUBLICATIONS

Swedish Patent Office, International Search Report for PCT/SE03/00176, dated Apr. 28, 2003.

*Primary Examiner* — Charles Shedrick
(74) *Attorney, Agent, or Firm* — Roger S. Burleigh (57) ABSTRACT

The present invention relates to a method and system of transmissions and retransmissions of packet data in a communications system, where the communications system uses switched channels, switching between rates or channels of different characteristics, and connection control and management in such a system. Particularly, the invention relates to radio resource management in a Universal Mobile Telecommunications System, UMTS, or WCDMA system allowing for use of compatible protocols for non-switched and switched channels.

12 Claims, 8 Drawing Sheets

(56) References Cited

U.S. PATENT DOCUMENTS

| | | |
|---|---|---|
| 5,583,869 A | 12/1996 | Grube et al. |
| 5,793,744 A | 8/1998 | Kanerva et al. |
| 2003/0043844 A1* | 3/2003 | Heller .......................... 370/466 |

* cited by examiner

METHOD AND SYSTEM OF CHANNEL RESOURCE ALLOCATION

TECHNICAL FIELD OF THE INVENTION

The present invention relates to transmissions and retransmissions of packet data in a communications system, where the communications system uses rate switching or channel switching. Especially, it relates to transmissions of packet data and channel resource allocation in a cellular mobile radio system, particularly a Universal Mobile Telecommunications System, UMTS, or WCDMA system.

BACKGROUND AND DESCRIPTION OF RELATED ART

Retransmission of data to or from a mobile station, MS, or User Equipment, UE, is previously known. It is also known to allocate channel resources in a system using rate switching or channel switching.

Within this patent application, a radio network controller, RNC, is understood as a network element including an RRM (Radio Resource Management) entity. The RNC is connected to a fixed network. Node B is a logical node responsible for radio transmission/reception in one or more cells to/from a User Equipment. A base station, BS, is a physical entity representing Node B. A server device provides information accessible to other devices over a communications network such as, e.g., the Internet. A client device is a device having access to information provided by one or more devices over a communications network.

Figure 1:
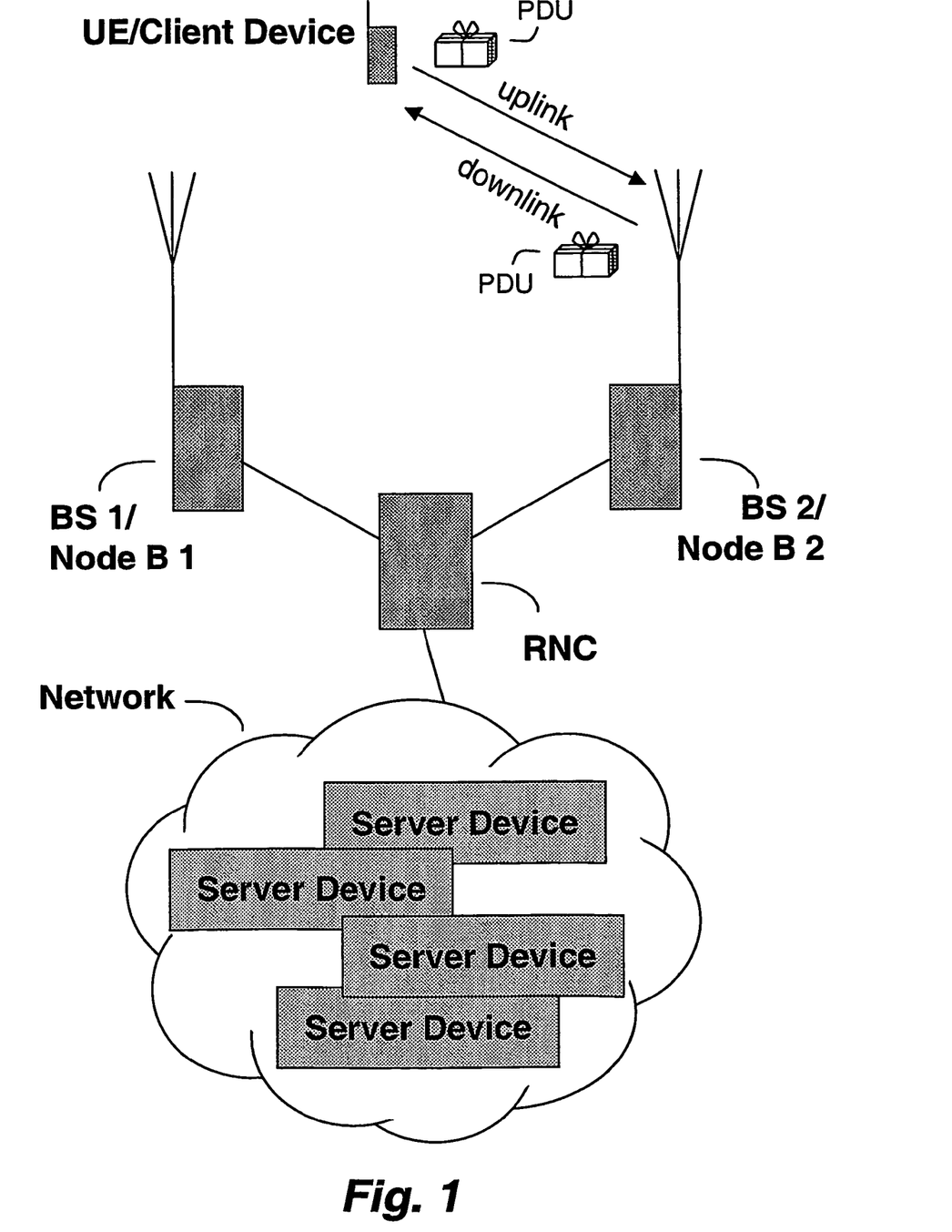
FIG. 1 shows communication between a UE and a base station involved in a connection between an RNC and the UE.

With reference to FIG. 1, base stations « BS 1>> and « BS 2» are physical entities representing Nodes B « Node B 1» and « Node B 2» respectively. « Node B 1» and « Node B 2» terminate the air interface, called Uu interface within UMTS, between UE and respective Node B towards the radio network controller « RNC ». « RNC » is connected to a fixed network « Network ». The fixed network may comprise one or more Server Devices « Server Device ».

Medium access control, MAC, and radio link control, RLC, is used within radio communications systems like General Packet Radio Services, GPRS, and UMTS.

Transport protocols, such as TCP (Transmission Control Protocol), are used widely for "reliable" packet data communications, where reliability refers to its ability to handle retransmissions of data packets that are, lost during transmissions and to control transmission rate based on link quality in terms of packet loss and delay characteristics. There are also protocols, such as UDP (Users Datagram Protocol), considered "unreliable" in the sense that they do not themselves inherit retransmissions.

Transport protocol packets carry packets according to application-level protocols such as Hypertext Transfer Protocol (HTTP).

International Patent Application WO9965219 discloses a TCP/IP/PPP modem including an HTML packet sniffer. The HTML packet sniffer interprets the packet header to determine if the data content contains valid HTML data. If so, an HTML rating decoder begins to parse the HTML data for rating tags. An HTTP response parser interprets an HTTP header.

The Internet Society: Request for Comments (RFC) No. 2616, June 1999 describes Hypertext Transfer Protocol 1.1 (HTTP 1.1). Sections 4.4 and 14.13 describe determination of message length.

The Internet Society: Request for Comments (RFC) No. 3135, June 2001 describes proxy solutions for some explicitly mentioned systems, including systems operating with TCP for communication links being subject to small bandwidth-delay products, such as W-LANs (Wireless Local Area Networks), W-WANs (Wireless Wide Area Networks) and GSM (Global System for Mobile Communications) or links optimized with small block error rates (BLER), such as satellite links.

U.S. Pat. No. 5,673,322 describes a split proxy system that encapsulates TCP/IP transmissions into a script transmission.

European Patent Application EP1109359 describes an apparatus and method for dividing a TCP connection into two connections, having congestion control in only one of the two connections.

$3^{rd}$ Generation Partnership Project (3GPP): *Technical Specification Group Radio Access Network, Radio Interface Protocol Architecture*, 3*GPP TS* 25.301 *v*3.6.0, *France, September* 2000, describes an overall protocol structure of a Universal Mobile Telecommunications System (UMTS). There are three protocol layers:

physical layer, layer 1 or L1,
data link layer, layer 2 or L2, and
network layer, layer 3 or L3.

Layer 2, L2, and layer 3, L3 are divided into Control and User Planes. Layer 2 consists of two sub-layers, RLC and MAC, for the Control Plane and four sub-layers, BMC, PDCP, RLC and MAC, for the User Plane. The acronyms BMC, PDCP, RLC and MAC denote Broadcast/Multicast Control, Packet Data Convergence Protocol, Radio Link Control and Medium Access Control respectively.

Figure 2:
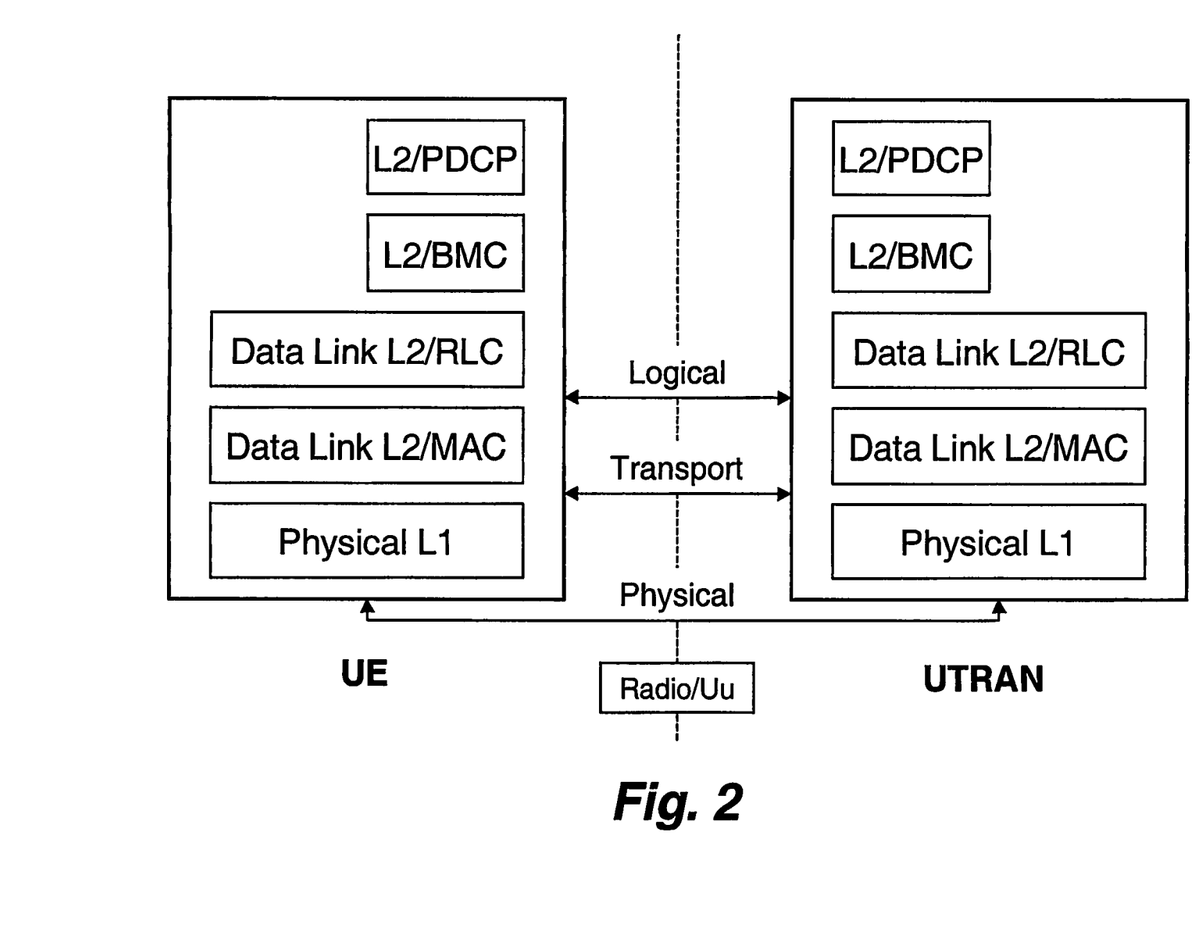
FIG. 2 displays a layered protocol structure, according to prior art, in a radio communications system.

FIG. 2 displays a simplified UMTS layers 1 and 2 protocol structure for a Uu Stratum, UuS, or Radio Stratum, between a User Equipment UE and a Universal Terrestrial Radio Access Network, UTRAN.

Radio Access Bearers, RABs, are associated with the application for transportation of services between core network, CN, and User Equipment, UE, through a radio access network. Each RAB is associated with quality attributes such as service class, guaranteed bit rate, transfer delay, residual BER, and traffic handling priority. An RAB may be assigned one or more Radio Bearers, RBs, being responsible for the transportation between UTRAN and UE. For each mobile station there may be one or several RBs representing a radio link comprising one or more channels between UE and UTRAN. Data flows (in the form of segments) of the RBs are passed to respective Radio Link Control, RLC, entities which amongst other tasks buffer the received data segments. There is one RLC entity for each RB. In the RLC layer, RBs are mapped onto respective logical channels. A Medium Access Control, MAC, entity receives data transmitted in the logical channels and further maps logical channels onto a set of transport channels. In accordance with subsection 5.3.1.2 of the 3GPP technical specification MAC should support service multiplexing e.g. for RLC services to be mapped on the same transport channel. In this case identification of multiplexing is contained in the MAC protocol control information.

Transport channels are finally mapped to a single physical channel which has a total bandwidth allocated to it by the network. In frequency division duplex mode, a physical channel is defined by code, frequency and, in the uplink, relative phase (I/Q). In time division duplex mode a physical channel is defined by code, frequency, and timeslot. As further described in subsection 5.2.2 of the 3GPP technical specification the L1 layer is responsible for error detection on transport channels and indication to higher layer, FEC encoding/decoding and interleaving/deinterleaving of transport channels.

PDCP provides mapping between Network PDUs (Protocol Data Units) of a network protocol, e.g. the Internet protocol, to an RLC entity. PDCP compresses and decompresses redundant Network PDU control information (header compression and decompression).

None of the cited documents above offers a method and system of retrieving channel resource requirements in systems using channel resource management, involving rate switching or channel switching, allowing for identical or same-type transport or application-level protocols for fixed and switched rates/channels. Nor do they provide an interface to channel resource management.

SUMMARY OF THE INVENTION

A system according to prior art includes buffering of data in a Radio Network Controller. This causes delay and round-trip time latency. I.e., the time for a user or user application to perceive a response to transmitted data or undertaken action from the receiving end is not immediate, but should be kept as small as possible.

With systems using channel resource management, such as radio resource management in UTRAN it is greatly desirable, however difficult to achieve, a method and system where channel resource can be allocated in a best match to data objects to be transferred over the channel introducing no or negligible additional delay.

Buffering of data for predictions causes delay of (one-way) data destined for a User Equipment. Protocols originally designed for wireline transmission, e.g. TCP (Transmission Control Protocol), can introduce further delay due to use of congestion algorithms behaving as if the channel were congested if not properly managing channel resources.

For data transmissions over link protocols with relatively small buffer sizes, evaluation of the need for capacity of existing connections and allocation of capacity to new connections for best-fit matching of data requirements are difficult or impossible.

Consequently, it is an object of this invention to increase utilization of channel resources of a channel switching system.

It is also an object of this invention to eliminate or reduce delay and latency as perceived by a user.

A related object is to reduce delay and latency as perceived by a congestion control algorithm with applications such as Internet connections over a radio link in a WCDMA (Wideband Code Division Multiple Access) system.

A further object is to enable or simplify allocation and management of capacity to new and existing connections, including evaluation and prediction of capacity needs' for various connections.

Finally, it is an object to accomplish the above mentioned objects without requiring interference of or operations on layer 3 semantics.

These objects are met by the invention, which is particularly well suited for a Universal Mobile Telecommunications System, UMTS, providing an interface between a sniffer device and channel resource management, particularly radio resource management.

Preferred embodiments of the invention, by way of examples, are described with reference to the accompanying drawings below.

DESCRIPTION OF PREFERRED EMBODIMENTS

As an example illustrating the fundamentals of the invention consider a User Equipment « UE/Client Device» of FIG. 1 requesting data from a network server « Server Device», responding by transmitting the requested data. In most application-level protocols the data request or the data response includes information on size of the requested data object. This information is passed through radio network controller « RNC» and base station « BS 2/Node B 2». As a non-exclusive example, the specification of HTTP 1.1, widely used in the Internet, specifies the header of a response to a data request to comprise such information. This information is of great value for management of strictly limited channel resources between base station « BS 2/Node B 2» and User Equipment « UE/Client Device». Retrieval of data object size included as one or more data packet elements can be achieved by passing packet data through or by a processing entity identifying or recognizing the relevant one or more data packet elements as they appear, in the sequel denoted as sniffing.

Figure 3:
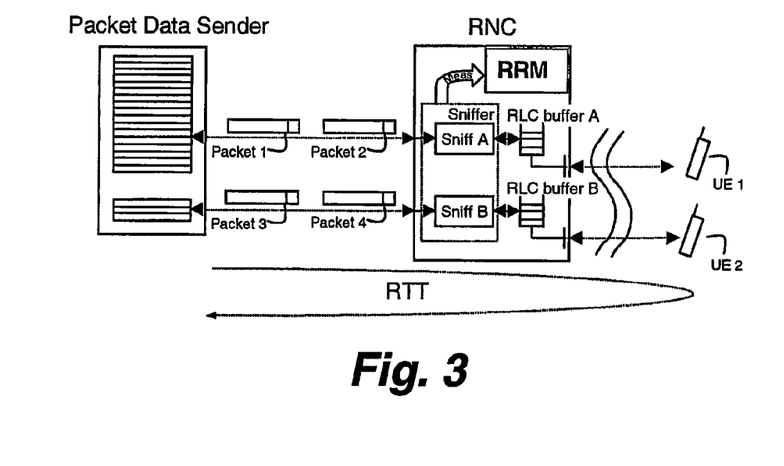
FIG. 3 displays a first embodiment for radio resource control, according to the invention.

FIG. 3 displays a first embodiment for radio resource control, according to the invention. A « Packet Data Server», e.g. a Web Server corresponding to « Server Device» of FIG. 1, transmits data packets to a User Equipment « UE» being client device.

Data packets «Packet 1», «Packet 2», «Packet 3», «Packet 4» are transmitted from the Packet Data Sender through a network to a Radio Network Controller. In accordance with UTRAN technical specifications, RNC includes an RLC protocol layer, as schematically illustrated in FIG. 2. «RNC» communicates with User Equipment «UE 1», «UE 2». The RNC comprises Radio Resource Management «RRM» undertaking radio resource control, assigning and switching channel resources. According to prior art, RRM relies on local traffic measurements in «RNC» and there are only limited means for distinguishing different traffic or data dependent needs for channel resources of different connections of the RNC. There is a sender-receiver relationship between «RNC» and «UE 1» and «UE 2», respectively. Packets transmitted from RLC protocol entity residing in RNC are acknowledged by User Equipment «UE 1», «UE 2». The sender-receiver relationship is subject to latency due to a round-trip delay between RNC and User Equipment «UE1», «UE2» included in the end-to-end round-trip delay time «RTT» as indicated in FIG. 3. Assuming that User Equipments «UE 1», «UE 2» are using an application making use of e.g. HTTP over TCP, such as web browsing, the Packet Data Sender «Data Sender» the transmits exemplary HTTP packets in TCP packets to be acknowledged by the respective client devices «UE 1», «UE 2». To avoid confusion, "application protocol acknowledgements" refer to acknowledgements associated with the L3 network layer and "RLC acknowledgements" refer to acknowledgements associated with the L2/RLC protocol layer. As the application protocol acknowledgements and the RLC acknowledgements are nested, the application protocol acknowledgments will perceive an increasing round-trip time delay as the RLC acknowledgements round-trip time increases.

As a user moves with his User Equipment away from a base station «BS 1» towards another base station «BS 2» in FIG. 1, the connection between UE and RNC is likely to be rerouted from being over a first Node B «Node B 1» to being over a second Node B «Node B 2» or over both «Node B 1» and «Node B 2» using soft handover. In FIG. 1, the base stations are connected to the same radio network controller RNC. However, the invention also covers the exemplary situation where the base stations are connected to different RNCs. In UMTS, the RLC protocol is terminated in a serving RNC, SRNC, responsible for interconnecting the radio access network of UMTS to a core network.

An aspect of the invention is that according to prior art there is a risk of radio resources being underutilized and users experiencing increased latencies and delays or even the connection being broken. There is also a risk for the transfer from the data provider to stall.

In UMRS, existing RLC protocols operate with limited buffer sizes. One reason for this is delay constraints. According to prior art data throughput and buffer status measurements provide very limited information on the future bandwidth needs of a connection. Buffer fill level and data throughput measurements provide no means to distinguish whether the packets presently loading the link are the last few of a transfer, or if there remains a lot of data at the sender still to be transmitted. Consequently, evaluation of data-related need for capacity of existing connections and allocation of capacity to new connections are difficult or impossible. There is no information in RLC buffer on how large objects a client is retrieving from the Packet Data Sender, e.g. downloading, to estimate a user's near-future need, associated with the data he is retrieving, for channel capacity.

As a non-exclusive example illustrating a problem of prior art, RRM may perform a channel up-switch, allocating more channel capacity to a connection, at a moment when the last bits of a data transfer have been transmitted leading to waste of channel resource of no value to the user obtaining data bandwidth increase, reducing the data bandwidth available to other connections of a scarce shared channel resource.

The problem cannot be solved by increasing RLC buffer size, as long as the RLC buffer is part of an end-to-end-delay of a connection between a data provider and an end user, where the data provider awaits application protocol acknowledgements from the user, since increasing RLC buffer size would introduce additional delay and require extensive time-out limits.

Another aspect of the invention, related to problem in prior art, is evaluation when there is a plurality of on-going connections. It is difficult or impossible for the channel resource management, such as RRM (Radio Resource Management) in UMTS, to evaluate which connection or connections of a plurality of active ones that is in need for more capacity or bandwidth.

An advantage of introducing a sniffer according to the invention is that the needs of individual users/clients can be predicted or information on future needs be retrieved before the need appears, in contrast to prior art. From information on object sizes channel resources can be appropriately allocated according to the needs as predicted or retrieved.

A problem related to a transport protocol such as TCP and channel switching is that sudden buffer drainage in RLC buffer, or corresponding prior art buffer, or low throughput due to, e.g., TCP loss recovery or great variations in packet delays may trigger unwanted channel down switch if, e.g., channel resource management interprets data transmissions to have ended notwithstanding a lot of data remain to be sent from the data provider. A straightforward solution to avoid channel down-switching is to have extensive prohibit time delays prohibiting channel down-switching during a predefined time frame beginning at the first instance of indication of a broken connection or a connection with less need for capacity. However, such a solution would be inefficient in a channel resource perspective, prohibiting other connections to access channel resources of truly broken connections during the prohibit time frame, leaving scarce channel resources underutilized.

The present invention provides a solution also to this problem. Interfacing the data provider in close relation to channel resource management, such as RRM in UMTS, enables the data provider to proceed data transmissions. This will prevent data transmissions from getting stalled due to channel resources being poorly distributed to the various data streams, allowing for improved prediction of channel capacity to allocate. Consequently, prohibit time frames for channel down switching can be reduced or eliminated, increasing utilization of scarce channel resources, such as radio channel resources.

The present invention provides for efficient channel switching and good radio resource utilization of particularly a UNRS system, but also applies to other systems using packet services such as GPRS, enabling reliable predictions of future bandwidth needs of connections close to radio resource management, generally located in RNC.

Figure 4:
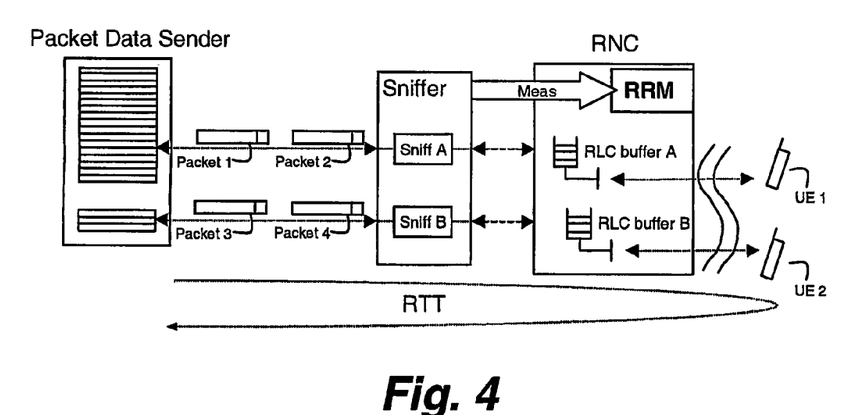
FIG. 4 illustrates schematically a second embodiment for radio resource control, according to the invention.

FIG. 4 illustrates schematically a second embodiment for radio resource control according to the invention. FIG. 4 corresponds in a plurality of aspects to FIG. 3. Data packets «Packet 1», «Packet 2», «Packet 3» and «Packet 4» are transmitted from a Packet Data Sender. The data packets destined for User Equipments «UE 1», «UE 2» are routed by radio network controller «RNC». Data is passed through a sniffer device «Sniffer» comprising at least one sniffing entity «Sniff A», «Sniff B», sniffing data streams passing through «RNC» and «Sniffer» for information on data object size(s). In FIG. 4, and also in FIG. 3, signaling «Meas» carrying information revealing size of data object(s) for reserving and allocating channel resources corresponding to revealed data object size(s) is transferred «Meas» from the sniffer device «Sniffer» to radio resource management «RRM». Channel allocation is determined by radio resource management, RRM, depending on estimated resource requirement as indicated by signaling «Meas» from device «Sniffer» to RNC-entity «RRM». The signaling can be transferred individually for each sniffing entity, «Sniff A», «Sniff B» or collectively for a plurality of sniffing entities in sniffer device «Sniffer». In FIG. 4, the sniffer entity «Sniff A», «Sniff B» is included in a stand-alone unit «Sniffer», connected to a radio network controller «RNC», whereas in FIG. 3 the one or more sniffing entities «Sniff A», «Sniff B» are included in «RNC».

Figure 5:
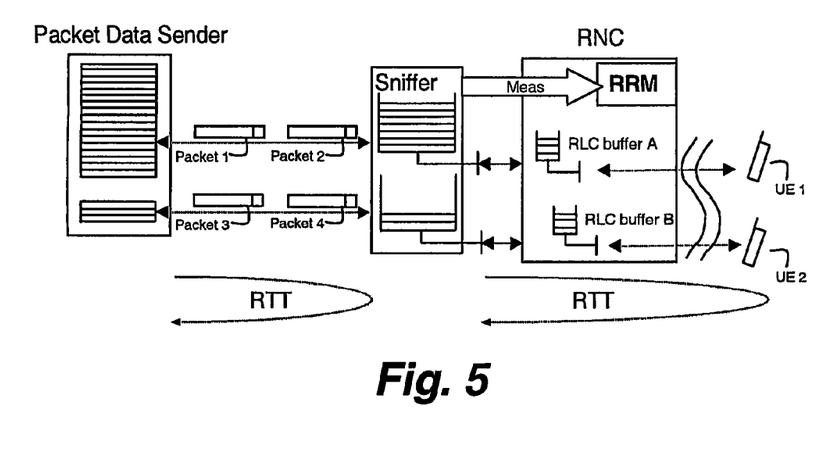
FIG. 5 displays a third embodiment for radio resource control, according to the invention.
Figure 6:
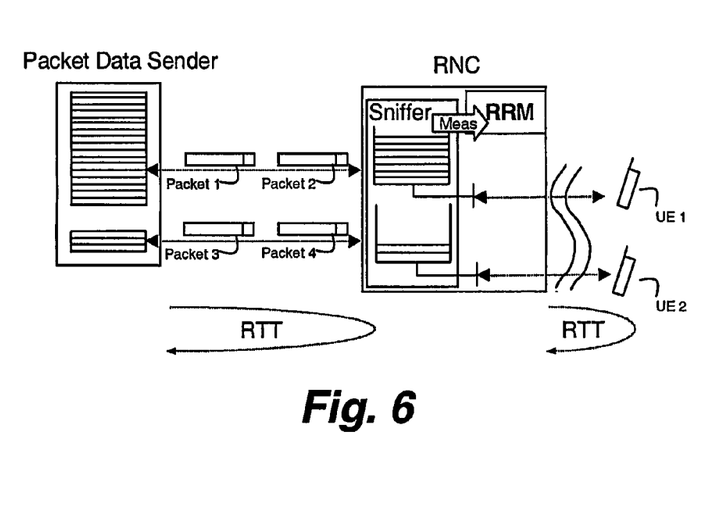
FIG. 6 shows a fourth embodiment for radio resource control, according to the invention.

FIGS. 5 and 6 display a third and forth embodiment, respectively, for radio resource control, according to the invention. According to the third and fourth embodiments, the sniffer comprises buffers of sizes sufficiently large to store objects of data, in their entirety or in part, to be transmitted to the client. The sniffer solution does not exclude splitting the application protocol connection between «Packet Data Sender» and client «UE 1», «UE 2» into two parts. This is the case for the embodiment in FIGS. 5 and 6, with the sniffer in a stand-alone device connected to RNC and in FIG. 6, where it is integrated in RNC. Again, data in one direction, particularly downlink direction, is sniffed for information on block-sizes, e.g. HTTP content-length, to be used for radio resource management in «RRM». Block-size data is transferred «Meas» from «Sniffer» to «RRM».

A particular advantage is achieved if a connection such as, a TCP-connection is split into sub-connections, acknowledging correctly received data packets, for an individual sub-connection, thereby reducing round-trip time latency and jitter.

Buffered data can be made further use of to predict the need for channel resources to transmit the data packets of the objects. Thereby, reliability and timeliness of radio resource control, based upon data from «Sniffer» can be further increased.

In the fourth embodiment of FIG. 6, the buffers of the sniffer are made use of also for RLC buffering. FIGS. 3, 4 and 5 are illustrated to comprise dedicated RLC buffers for this purpose.

Figure 7:
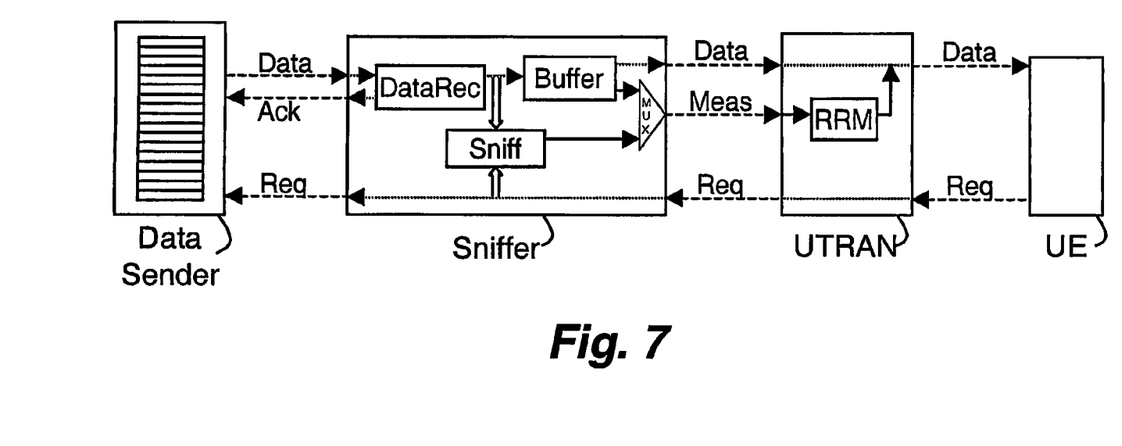
FIG. 7 shows a stand-alone sniffer sniffing data requests in uplink direction or data responses in downlink direction, according to the invention.

FIG. 7 shows a block diagram with a stand alone sniffer unit «Sniffer» connected to a universal terrestrial radio access network «UTRAN», according to the invention. The sniffer includes one or more sniffing entities «Sniff», sniffing data requests «Req» in uplink direction, data responses «Data» in downlink direction or both. A data sender «Data Sender» transmits upon request «Req» data «Data» destined for a user of a User Equipment «UE» in a communications system including an exemplary universal terrestrial radio access network «UTRAN» providing data for «UE». Universal terrestrial radio access network «UTRAN» sends data «Data» to User Equipment «UE» over a switched channel. User Equipment «UE» acknowledges received data, positively or negatively. Data from «Data Sender» is received and is optionally acknowledged «Ack» in a data receiver «DataRec» in «Sniffer». In the case of sniffer application protocol acknowledgements, received data is cached or stored in a data buffer «Buffer» in «Sniffer». The buffered data is used for determining data related to radio resource allocation «Meas», e.g. block-size data, for radio resource management «RRM» in UTRAN. Data is transferred from «Sniffer» to its destination «UE» on a switched channel as established by UTRAN. In the case of sniffer application protocol acknowledgements, UE acknowledges received data towards the sniffer in place of data sender. Upon reception of such application protocol acknowledgement, data need not be stored any further for the acknowledging destination and is preferably released from «Buffer».

The invention does not require separate application protocol acknowledgements by sniffer, interfering layer 3 semantics or breaking an end-to-end link. Thereby, the sniffer can be made more or less insensitive to e.g. associated problems related to handover of buffer content.

Irrespective of whether or not data is acknowledged by «Sniffer», it sniffs data for information on link requirements. Measurements «Meas» on link requirements forming a basis for radio resource allocation are transferred from «Sniffer» to radio resource management «RRM». Data requested by UE is transferred to data sender via «UTRAN». Preferably, the sniffer forms part of an extended UTRAN.

Figure 8:
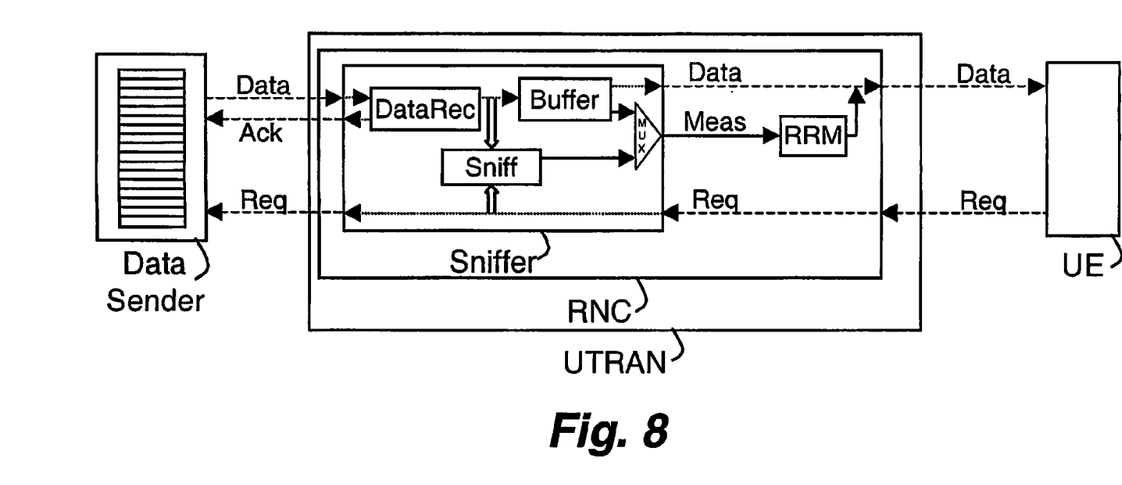
FIG. 8 illustrates a sniffer sniffing data requests in uplink direction or data responses in downlink direction integrated with RNC, according to the invention.

FIG. 8 illustrates a performance enhancing proxy «Sniffer», according to the invention, integrated with radio network controller «RNC», being part of «UTRAN» in an exemplary WCDMA system. As with FIG. 7, also the sniffer device «Sniffer» in FIG. 8 sniffs data requests «Req» in uplink direction, data responses «Data» in downlink direction or both. Transmissions and devices are similar to those of FIG. 7, labeled correspondingly.

Figure 9:
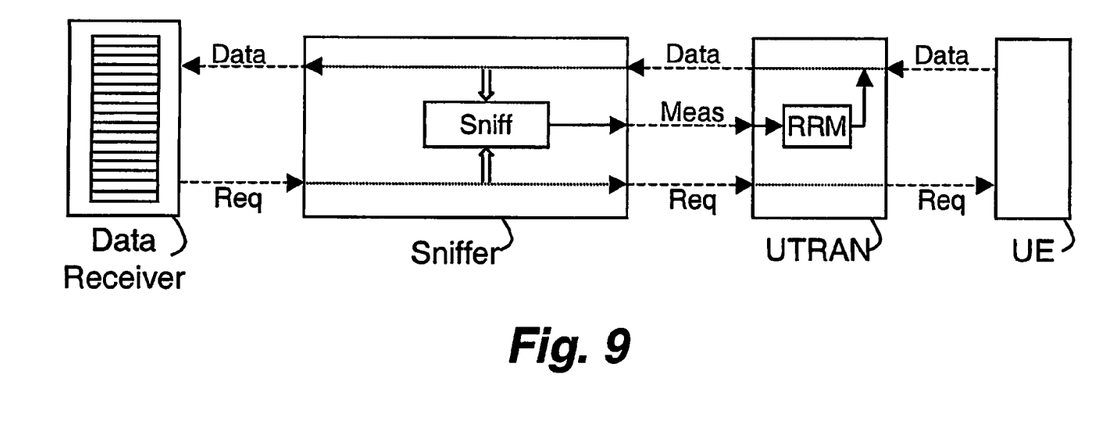
FIG. 9 illustrates a sniffer sniffing data requests in downlink direction or data responses in uplink direction, according to the invention.

FIG. 9 shows an embodiment of the invention sniffing data requests «Req» in downlink direction, data responses «Data» in uplink direction or both. The sniffer «Sniffer» comprises one or more sniffing entities «Sniff» for sniffing data requests «Req» or data responses «Data». Depending on sizes of data objects, radio resource management «RRM» allocates radio resources of a switched channel. Of course, the sniffers of FIGS. 7 and 9 can be incorporated into one single sniffer entity sniffing requests in both downlink and uplink directions. As for FIG. 7, also the sniffer of FIG. 9 preferably forms part of an extended UTRAN.

Figure 10:
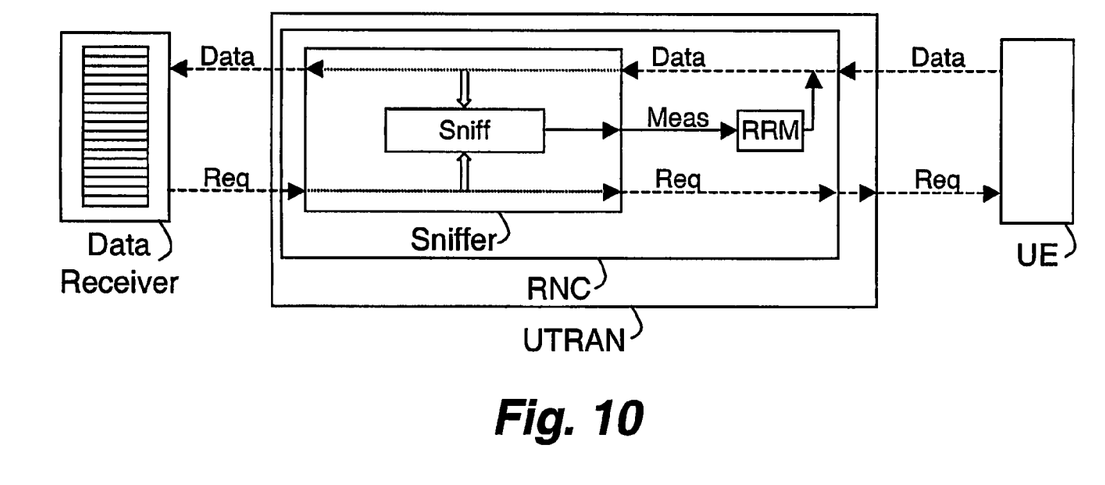
FIG. 10 illustrates a sniffer sniffing data requests in downlink direction or data responses in uplink direction integrated with RNC, according to the invention.

FIG. 10 shows an embodiment with «Sniffer», corresponding to «Sniffer» of FIG. 9, integrated in radio network controller «RNC» of «UTRAN». Entities corresponding to those of FIG. 9 have been labeled correspondingly.

Figure 11:
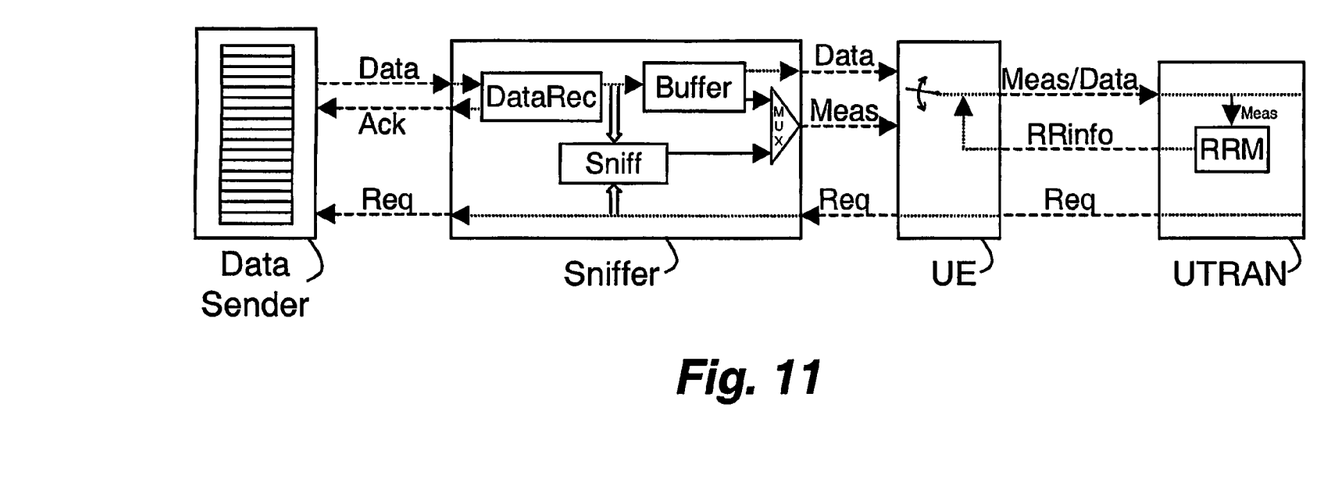
FIG. 11 shows a block diagram with a stand-alone sniffer sniffing data requests in downlink direction or data responses in uplink direction connected to a User Equipment, according to the invention.

FIG. 11 shows a block diagram with a stand-alone sniffer unit «Sniffer» connected to a User Equipment «UE» according to the invention. The sniffer, sniffing data requests «Req» in downlink direction, data responses «Data» in uplink direction or both, can be connected to User Equipment «UE» on Data Sender side or on UTRAN side of User Equipment «UE». A data sender «Data Sender» transmits data destined for a Data Receiver or Server Device (not included in the figure) in a network behind an exemplary universal terrestrial radio access network «UTRAN» over a switched channel as established by UTRAN.

A data receiver «DataRec» in the sniffer device «Sniffer» receives data from «Data Sender». The sniffer device «Sniffer» can optionally acknowledge «Ack» data received from «Data Sender», positively or negatively. For this case, received data is cached or stored in an optional data buffer «Buffer», as described in relation to FIG. 7.

Data requests «Req» or data responses «Data» passed through the sniffer are analyzed for size of requested objects. Optionally buffered data may be used for further measurements or extraction of prediction data. Data on requested object sizes and optionally further measurements or prediction data «Meas» is transferred to radio resource management «RRM» in UTRAN. Prediction data «Meas» is transferred from «UE» to «UTRAN» on a switched channel as established. This can be identically the same channel used for payload, as well as another channel. However, for reasons of simplicity, a separate dashed line between «Sniffer» and «UE», and a single dashed line from «UE» to «UTRAN» indicate the transfer. Radio resource management data «RRinfo» for rate and channel selection is transferred from «UTRAN» to «UE» on a downlink channel. For reasons of clarity this is indicated by a separate dashed line between «UTRAN» and «UE».

Figure 12:
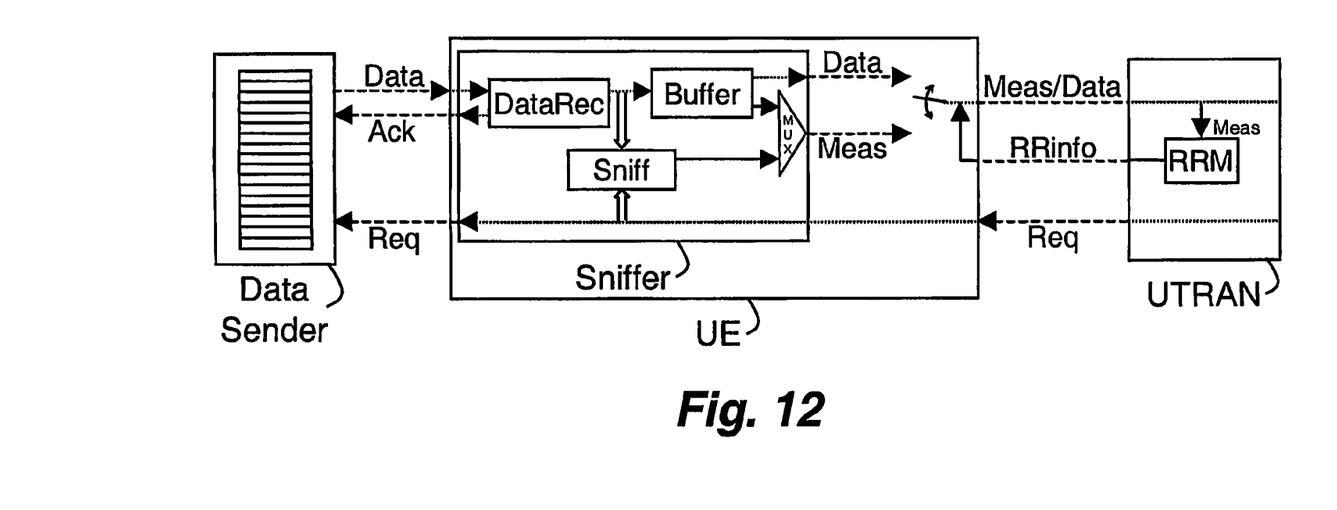
FIG. 12 illustrates an exemplary sniffer sniffing data requests in downlink direction or data responses in uplink direction integrated with a User Equipment, according to the invention.

FIG. 12 illustrates an exemplary sniffer device «Sniffer» according to the invention. The sniffer, sniffing data requests «Req» in downlink direction, data responses «Data» in uplink direction or both, is integrated with a User Equipment «UE», preferably a User Equipment of a WCDMA system. Transmissions and devices are similar to those of FIG. 11 labeled correspondingly.

Also requests for data in uplink direction and their responses in downlink direction can be analyzed by a sniffer associated with a User Equipment, if appropriate.

Figure 13:
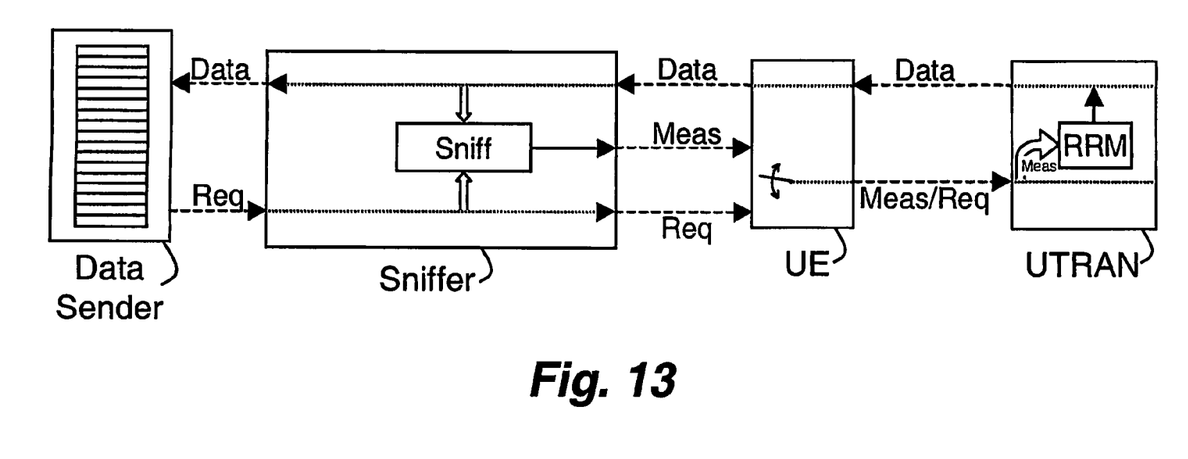
FIG. 13 shows a block diagram with a stand-alone sniffer sniffing data requests in uplink direction or data responses in downlink direction connected to a User Equipment, according to the invention.

FIG. 13 shows a block diagram with a stand-alone sniffer unit «Sniffer» being connected to a User Equipment «UE» according to the invention. The sniffer, sniffing data requests in uplink direction, data responses in downlink direction or both, can be connected to User Equipment «UE» on Data Sender side or on UTRAN side of User Equipment «UE». A data receiver «Data Receiver» receives data from a Data Sender or Server Device (not included in the figure) in a network behind an exemplary Universal Terrestrial Radio Access Network «UTRAN» over a switched channel as established by UTRAN.

Data requests or data responses passed through the sniffer are analyzed for size of data objects. Data on object sizes and optionally further measurements or prediction data «Meas» is transferred to radio resource management «RRM» in UTRAN. Prediction data «Meas» is transferred from «UE» to «UTRAN» on a switched channel as established. This can be identically the same channel used for payload, as well as another channel. However, for reasons of simplicity, a separate dashed line between «Sniffer» and «UE», and a single dashed line from «UE» to «UTRAN» indicate the transfer. Radio resource management allocates channel resources in «UTRAN».

Figure 14:
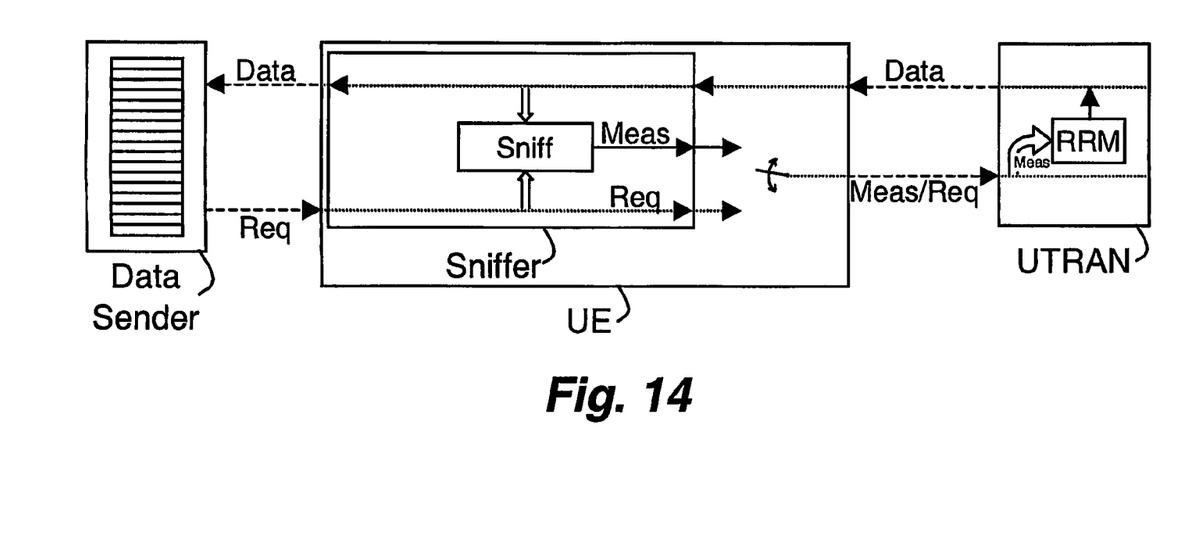
FIG. 14 illustrates an exemplary sniffer sniffing data requests in uplink direction or data responses in downlink direction integrated with a User Equipment, according to the invention.

FIG. 14 illustrates an exemplary sniffer device «Sniffer» according to the invention. The sniffer, sniffing data requests in downlink direction, data responses in uplink direction or both, is integrated with a User Equipment «UE», preferably a User Equipment of a WCDMA system. Transmissions and devices are similar to those of FIG. 13 labeled correspondingly.

Of course, various combinations of sniffing entities «Sniff» of FIGS. 7-14 can be combined to achieve an interface to radio resource management sniffing uplink and downlink directions in different entities. A particular advantage of the invention is that sniffing of both uplink and downlink directions can be accomplished in one single sniffer device, e.g. located in RNC.

Preferably, all retransmission entities, interconnecting networks or channels of different characteristics, e.g. RNCs in UMTS, operate according to the invention for outstanding performance. However, the invention can also be used in systems also including retransmission entities, such as RNCs, not operating according to the invention.

A person skilled in the art readily understands that the receiver and transmitter properties of a BS or a UE are general in nature. The use of concepts such as BS, UE or RNC within this patent application is not intended to limit the invention only to devices associated with these acronyms. It concerns all devices operating correspondingly, or being obvious to adapt thereto by a person skilled in the art, in relation to the invention. As an explicit non-exclusive example the invention relates to mobile stations without a subscriber identity module, SIM, as well as user equipment including one or more SIMs. Further, protocols and layers are referred to in close relation with UMTS and Internet terminology. However, this does not exclude applicability of the invention in other systems with other protocols and layers of similar functionality.

The invention is not intended to be limited only to the embodiments described in detail above. Changes and modifications may be made without departing from the invention. It covers all modifications within the scope of the following claims.

The invention claimed is:

1. A method of channel resource allocation in a wireless communications system, said method comprising the steps of:
   sniffing one or more data transmissions to or from a data provider for information within one or more application-level data packets, the information being related to application-level data object size; and
   allocating radio resources as a function of said data object size, wherein said step of allocating radio resources comprises the step of predicting a future data rate from the information related to data object size.

2. The method according to claim 1, wherein said step of allocating radio resources comprises the step of selecting one or more channel characteristics.

3. The method according to claim 2, wherein said channel characteristics are selected from the group consisting of:
   data rate;
   dedicated or shared usage;
   scheduling;
   modulation;
   spreading code spreading factor; and
   transmission power.

4. The method according to claim 1, wherein said one or more data transmissions are sniffed in an uplink direction.

5. The method according to claim 1, wherein said one or more data transmissions are sniffed in a downlink direction.

6. The method according to claim 1, wherein one or more of said application-level data packets are cached prior to being transmitted using said radio resources.

7. A system for channel resource allocation in a wireless communications system, said method comprising:
   means for sniffing one or more data transmissions to or from a data provider for information within one or more application-level data packets, the information being related to application-level data object size; and
   means for allocating radio resources as a function of said data object size, wherein said means for allocating radio resources comprises means for predicting a future data rate from the information related to data object size.

8. The system according to claim 7, wherein said means for allocating radio resources comprises means for selecting one or more channel characteristics.

9. The system according to claim 8, wherein said channel characteristics are selected from the group consisting of:
   data rate;
   dedicated or shared usage;
   scheduling;
   modulation;
   spreading code spreading factor; and
   transmission power.

10. The system according to claim 7, wherein said one or more data transmissions are sniffed in an uplink direction.

11. The system according to claim 7, wherein said one or more data transmissions are sniffed in a downlink direction.

12. The system according to claim 7, wherein one or more of said application-level data packets are cached prior to being transmitted using said radio resources.

* * * * *

UNITED STATES PATENT AND TRADEMARK OFFICE
CERTIFICATE OF CORRECTION

PATENT NO. : 8,848,617 B2
APPLICATION NO. : 10/501513
DATED : September 30, 2014
INVENTOR(S) : Sågfors et al.

It is certified that error appears in the above-identified patent and that said Letters Patent is hereby corrected as shown below:

On the title page item (12), delete "Sāgfors" and insert -- Sågfors --, therefor.

On the title page item (75), delete "Sāgfors," and insert -- Sågfors, --, therefor.

On the title page item (75), delete "Huertgenwald" and insert -- Hürtgenwald --, therefor.

In the specification

Column 1, Line 32, delete " « BS 1>> " and insert -- «BS 1» --, therefor.

Column 1, Line 46, delete "are," and insert -- are --, therefor.

Column 3, Line 50, delete "needs'" and insert -- needs --, therefor.

Column 5, Line 53, delete "UMRS," and insert -- UMTS, --, therefor.

Column 6, Line 54, delete "UNRS" and insert -- UMTS --, therefor.

Column 7, Line 33, delete "such as," and insert -- such as --, therefor.

Signed and Sealed this
Fifteenth Day of March, 2016

Michelle K. Lee
*Director of the United States Patent and Trademark Office*